United States Patent
Eguchi et al.

[15] 3,703,963
[45] Nov. 28, 1972

[54] SLUDGE HYDROEXTRACTOR

[72] Inventors: Fusatoshi Eguchi, Fujisawa; Sohei Okamoto, Tokyo-to; Mashio Yamaha, Tokyo-to; Nobuo Matsumoto, Tokyo-to; Minoru Yokoyama, Tokyo-to, all of Japan

[73] Assignee: Ebara Infilco Kabushiki Kaisha, Tokyo-to, Japan

[22] Filed: July 20, 1970

[21] Appl. No.: 56,572

[30] Foreign Application Priority Data

July 24, 1969    Japan .................. 44/58535
Oct. 29, 1969    Japan .................. 44/102755
Aug. 21, 1969    Japan .................. 44/79603

[52] U.S. Cl. .................. 210/386, 210/396, 210/401
[51] Int. Cl. .................................. B01d 33/04
[58] Field of Search ....... 210/400, 401, 350, 386, 396

[56] References Cited

UNITED STATES PATENTS 3,084,987   4/1963   Bounin .................. 210/401 X
2,904,495   9/1959   Ferris .................... 210/401 X
2,097,529   11/1937  Nordell .................. 210/401 X

*Primary Examiner*—John Adee
*Attorney*—Blum, Moscovitz, Friedman & Kaplan

[57] ABSTRACT

An apparatus for effecting separation of solids from liquids by repetititve utilization of capillary action provided by a water-absorptive sponge or other like medium, in which a material to be dewatered is fed in uniform thickness on a travelling-endless-water-absorptive sponge belt so that when said material passes a concentration zone, the water in said material is sucked up by the sponge belt so as to increase solid concentration in said material, and then when the belt passes a hydroextraction zone where opposed groups of press rolls are provided, repeated expansion and contraction of the sponge is conducted between the sponge belt and a water-impervious endless belt opposed thereto by means of said roll system, and finally in the scraping zone the dewatered cake is scraped off.

9 Claims, 8 Drawing Figures

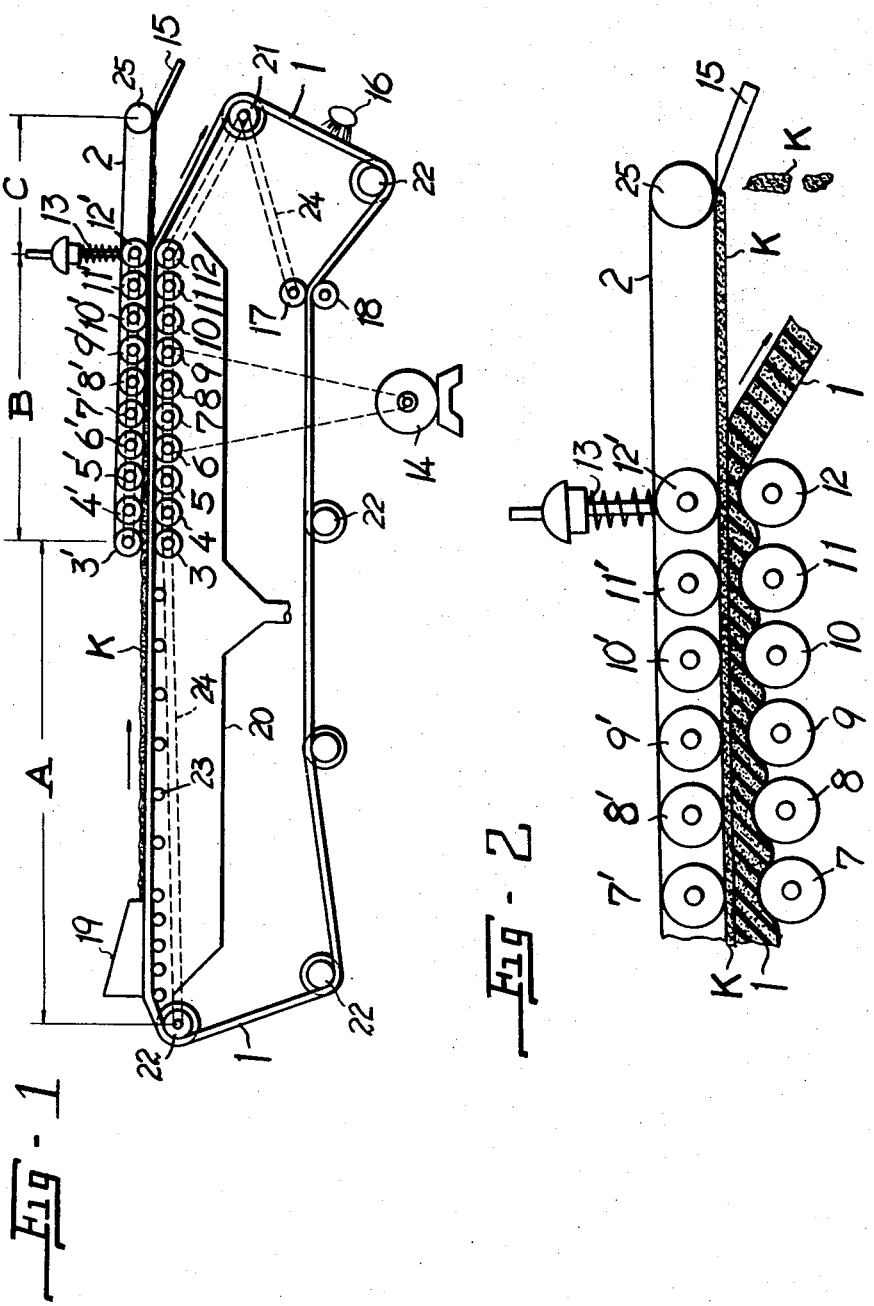

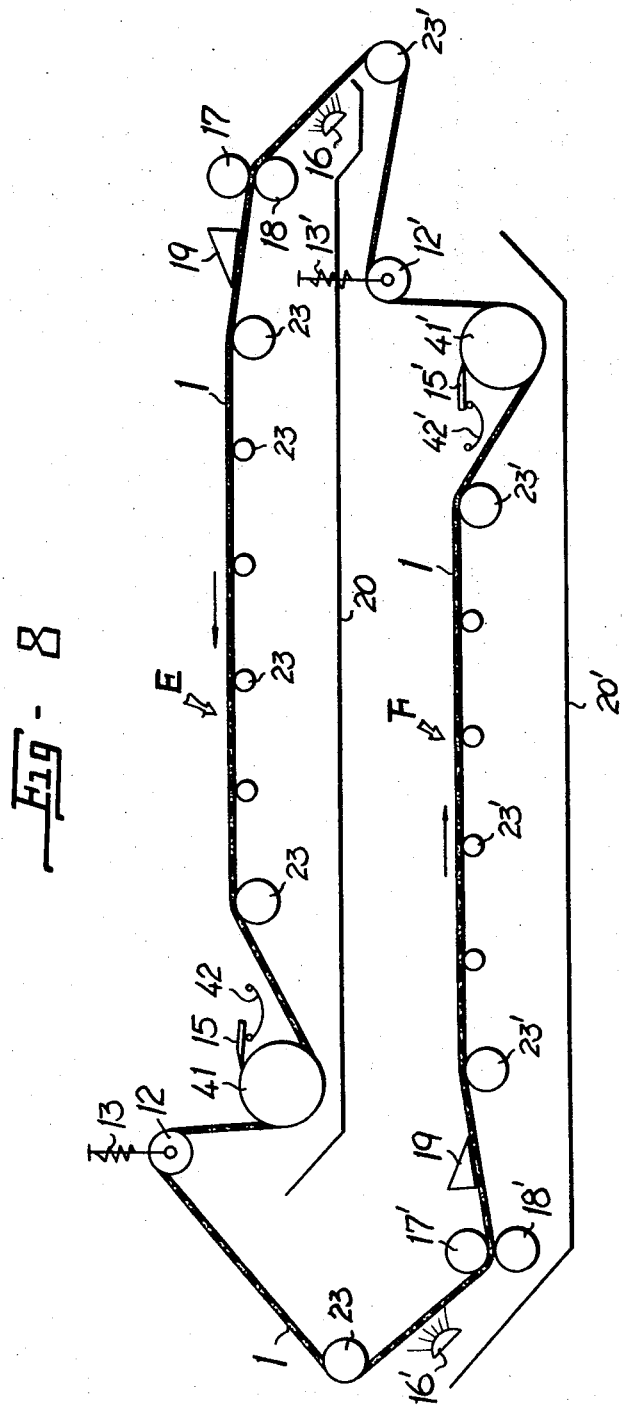

SLUDGE HYDROEXTRACTOR

STATE OF THE ART

Heretofore, vacuum filtration, pressure filtration and centrifugal separation techniques have been generally utilized for hydroextraction of sludges and other muddy substances. However, such hydroextraction methods were accompanied with the following defects:

In the case of vacuum filtration, it is necessary to elevate the concentration of the sludges to be dehydrated. Also, the filter cloth tends to give rise to a meandering phenomenon. Further, such attachments to the filter machine as vacuum pumps, filtrate tanks, etc., are essentially required. While in the case of pressure filtration, the filtering operation is intermittent, the treating capacity is limited, and in addition, washing of the filter cloth is difficult. Centrifugal separation, on the other hand, requires large power consumption, resulting in high percentage of water content in the dehydrated cake and also lacks safety in the operation.

Among the prior art, hydroextracting apparatus used particularly for hydroextraction of the slips or suspensions of which vacuum hydroextraction is usually very difficult, there is known an apparatus where a sponge-like filter cloth made of various types of material, such as foam rubber, felt and the like, or a filter cloth made of a porous elastic material is used, while adopting the principle of capillary action offered thereby. The most serious problem in such apparatus is the method of removing the liquid which has been absorbed from the slip and then sucked in the sponge-like filter cloth. Usually, as to such apparatus, the slip fed on the filter cloth is passed between a plurality of compression rolls so as to effect absorption of the liquid by means of capillary action of the filter cloth and removal of the liquid from the slip as well as from the filter cloth by means of said compression rolls. However, according to such method, there is the inconvenience that the liquid squeezed out of the filter cloth, while passing between the compressions rolls, would often re-wet the cake that was once dehydrated and turn it once more into a slip-like mass.

Also, in this type of hydroextraction, processes utilizing centrifugal filtration, pressure filtration or vacuum filtration, the supply of the sludge is made only in a fixed amount corresponding to the filtering capacity of the apparatus, and no other consideration was paid to the feeding method. The greatest problem of the latest hydroextraction apparatus, employing the principle of capillary action by a water-absorptive belt for hydroextraction of hardly-dehydratable sludges, concerns the fact that although uniform feed of sludge on the filter medium is of great importance for effective hydroextraction, it is very difficult to feed the sludge uniformly on the filter medium with the conventional feeding means. The sludge may also leak away from a void or voids between the feeding means and the water-absorptive filter medium to cause trouble to the filtering action, thus making it extremely difficult for a smooth sludge feeding operation, maintenance of the apparatus, and safety of the operation.

SUMMARY OF THE INVENTION

The present invention is concerned generally with a sludge hydroextractor device equipped with a travelable-endless-water-absorptive belt, which has formed on its upper traveling surface a concentration zone, a hydroextraction zone and a strip-off or scraping zone in that order in the traveling direction. A water-impervious body is provided in said hydroextraction zone, said water-impervious body being arranged in opposition and adjacent to said water water-absorptive belt so as to allow discharge of water contained in said belt.

The present invention also contemplates a liquid-extraction device for removing the liquid from the sludges by means of a traveling-endless-water-absorptive belt, in which said water-absorptive belt is reversed many times in its traveling course by means of the supporting rolls so as to form multiple stages of the belt. A sludge feeder means and a cake scraper means are provided on the traveling surface of each of said stages.

The present invention also provides a sludge feeder device for the sludge hydroextractor, in which a water-absorptive belt is provided in an endlessly traveling manner, two continuous sludge reservoirs partitioned by an overflow weir being provided in a feeding box disposed on the sludge feeding zone formed on the upper traveling surface of said belt, the bottom of one of said sludge reservoirs being opened to said water-absorptive belt so as to constitute a sludge reservoir bottomed by a water-absorptive belt. There is also provided a flexible seal member in such a manner as to cover the space between the bottom of said sludge reservoir and the water-absorptive belt.

Another feature of the present invention is a liquid-extractor used for separating the liquid from the sludges containing a large amount of liquid by using a traveling sponge-like or porous elastic body as the filter cloth, characterized in that another traveling sponge-like or porous elastic body is provided in closely superposed relation on the opposite side of the sludge supporting surface of said filter cloth.

DETAILED DESCRIPTION OF THE INVENTION

The present invention relates to an apparatus for removing liquid from a sludge containing a large quantity of liquid, which is produced in water treatment and in other processes in the food industry, chemical industry, etc., and which is usually very difficult to filter.

It is a primary object of the present invention to provide an extremely efficient and inexpensive sludge hydroextractor which can markedly improve the hydroextraction treating capacity, is easy to operate, allows continuous treating operating with ease, and can also greatly enhance the working efficiency as compared with the conventional treating apparatus. For example, no pretreatment step is required for concentrating a low-concentration sludgy substance having a solid concentration of as low as 1 to 3 percent and can directly dehydrate such substance to a solid concentration of up to 20 to 40 percent, and also dispense with or markedly simplify the attachments.

It is an important object of the present invention to prevent the dehydrated cake on the sponge-like filter cloth from being re-wetted with liquid and again turned into a sludgy mass, thereby allowing an effective dewatering operation.

It is another object of the present invention to expedite liquid absorption after the feeding of the sludge, so as to increase the hydroextraction capacity and hydroextracting velocity of the apparatus.

It is still another object of the present invention to greatly improve treating capacity for hydroextraction by filtration, to allow simple handling and continuous treatment with ease, to markedly enhance the working efficiency as compared with the known treating apparatus, to promote liquid absorption, and to increase hydroextraction capacity and hydroextracting velocity.

It is an additional object of the present invention to enhance the utilization rate of the endless water-absorptive belt which performs the hydroextracting action and to alleviate the clogging tendency of the belt, thereby improving the hydroextraction capacity of the apparatus.

The present invention utilizes capillary action of the water-absorptive belt, so that the concentration step, which is indispensable in the conventional devices for pre-treatment for filtration and usually conducted by a separate means, can be performed in the same apparatus, and even a sludgy substance which has low concentration and is difficult to filter can be directly filtered and dewatered. Further, the attachments required are limited in number and greatly simplified, so that the apparatus of the present invention is simple in structure and easy to operate.

Further, according to the present invention, sludge hydroextraction efficiency is remarkably improved to allow highly effective continuous sludge-hydroextraction, thus eliminating all of the inconveniences and defects accompanying the hydroextraction works according to the prior art, and noticeably reducing the cost for treatment. Also, the necessity for troublesome inspection or care for maintenance of security is eliminated, thus allowing safe and effective hydroextracting treatment.

Another characteristic feature of the present invention is that the traveling endless water-absorbing belt, which performs capillary action, has closely attached along its underside another endless water-absorbing belt, whereby it is possible, with extreme ease and high reliability, to prevent the liquid, which was absorbed in the belt, from again returning into the dehydrated cake, thus making it possible to effectively and continuously carry out the desired hydroextracting treatment, to inhibit leakage, overflow, etc., of the sludge from the belt, and to raise the hydroextraction capacity and hydroextraction velocity. Also, the hydroextracting operation is carried out effectively without any wasteful loss to allow sizable reduction of cost for operation. Thus, the handling of the apparatus is simplified and the cost of equipment is economized.

Further, according to the filter device of the present ininvention utilizing a water-absorptive belt, there is provided a sludge reservoir provided with an overflow weir and bottomed by the water-absorptive belt itself in the operative condition. A sludge leakage preventive film is spread over the bottom of said reservoir, so that the sludge feeding can be effected evenly on the water-absorptive belt, allowing full utilization of capillary action of the belt and perfect prevention of leakage of the sludge so as to obviate any trouble to the sludge feed in the sludge reservoir. Thus, even a sludgy substance with low concentration and difficult to filter can be directly filtered and hydroextracted.

Moreover, the apparatus of the present invention can easily overcome the inconveniences and difficulties accompanying the conventional dewatering operations, can markedly reduce the cost of treatment, can eliminate any necessity of troublesome inspection or care for maintenance of security, and thus allows safe and effective dehydrating treatment.

In addition, according to the present invention, hydroextraction of the sludge can be conducted at each of the multiple stages constituted by repetitive reversal of the water-absorptive belt so that, in effect, both upper and lower faces of the belt can be utilized alternately, thereby realizing the best possible utilization of the belt, and minimizing the clogging of the belt so that the hydroextracting capacity per one set of apparatus is more than doubled over the conventional apparatus. Further, since the hydroextracting treatment is also conducted in the return course of the travel of the belt, the floor space for installation of the apparatus can be markedly reduced for its high performance, the structure being made compact to allow intensive integration and simplification of the driving system, easy maintenance of security, and safety of the attached equipment.

The present invention will be described in further detail by way of its preferred embodiments with reference to the accompanying drawings, in which:

FIG. 1 is a side view of the hydroextracting apparatus according to the present invention;

FIG. 2 is an enlarged sectional side view of the hydroextraction zone in the apparatus of FIG. 1;

FIG. 8 is a systematic side view of an additional embodiment of the present invention.

Figure 3:
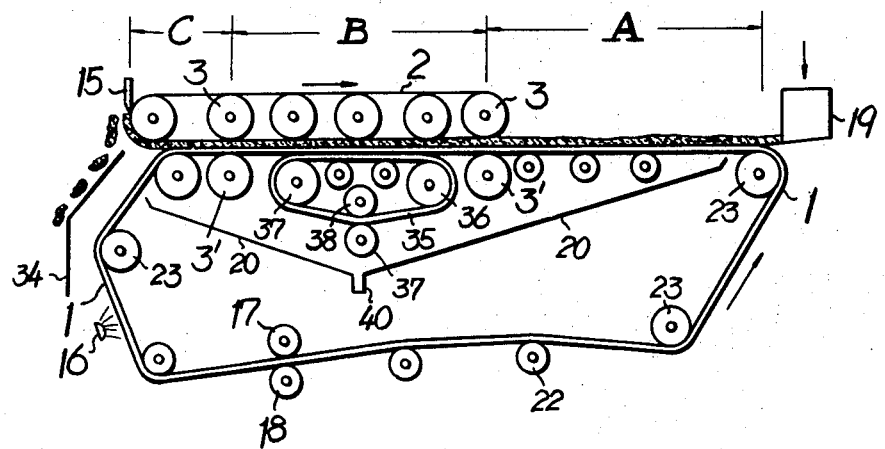
FIG. 3 is a side view of another embodiment of the present invention.

Referring first to FIGS. 1 and 2, there is shown an endless water-absorptive sponge belt 1 which is arranged movable in the direction of arrows while being supported by a plurality of supporting rolls and which has formed on its upper traveling surface a concentration zone A, a hydroextraction zone B and a scrape-off zone C arranged in that order in the traveling direction indicated by arrows. Spanning the hydroextraction zone B, there is provided a water-impervious endless belt 2 arranged in opposition to the water-absorptive belt 1 so as to allow removal of moisture contained in said belt 1, and on both sides of the opposed length of said both belts are provided a plurality of opposed rolling rolls 3, 4, 5, 6, 7, 8, 9, 10, 11, 12, and 3', 4', 5', 6', 7', 8', 9', 10', 11', 12', which are all coated with an elastic material of suitable hardness and which are so arranged relative to each other that the distance between said both belts is gradually narrowed down toward the outlet of the hydroextraction zone B. As will also be seen, a compression spring 13 is provided on the roll 12' at the outlet end of the zone B to allow free vertical movement of the roll when a hard extraneous substance has entered thereunder, thereby to prevent damage to the belts.

Also in the drawing, reference number 14 designates a prime mover for rotating said supporting rolls and opposed rolls through known means such as chains and sprockets, 15 a cake scraper knife provided near the end of the water-impervious endless belt 2 in the scrape-off zone C, 16 a shower for washing the water-absorptive sponge belt 1, 17 and 18 a pair of hydroextracting rolls for the water-absorptive sponge belt 1, 19 a feeding box for a material to be hydroextracted, which is provided at an end of the concentration zone A of the sponge belt 1, 20 a filtrate collecting trough disposed below the combined length of the concentration zone A and the hydroextraction zone B of the sponge belt 1, 21 a belt driving wheel, 22 track rollers, 23 guide rolls, 24 a driving belt, and 25 a track roller for the impervious belt 2, which, if need be, may be a driving wheel interlocked with the water-absorptive belt 1 or may be an independent driving wheel. Letter K denotes a cake.

Although in the shown embodiment a water-absorptive sponge is used to make the water-absorptive belt 1, it is also possible to use a water-absorptive cloth or other materials which have the same effect. Also, in the embodiment shown in the drawing, an opposed-rolls system is used for supporting the water-impervious belt. Such rolls system may be substituted by a flat, corrugated, curved or otherwise suitably shaped plate assembly, or a combination of rolls and plates. It is also possible to provide means for vertically moving said supporting members or for pressing the belt downwardly or upwardly, or to make the arrangement such that the distance between the opposed supporting members is gradually narrowed, so as to expedite removal of moisture in the water-absorptive belt 1. In the case of the former, when the supporting structure on the impervious belt side is made movable, it is advisable to make the impervious belt from a belt having suitable elasticity so as to obtain better hydroextracting effect.

In operation, a substance to be hydroextracted is supplied from the feeding box 19 onto the travelling water-absorptive sponge belt 1 such that said substance is laid substantially in uniform thickness on said belt, and while traveling through the concentration zone A, said substance is concentrated due to capillary action of the sponge until said substance loses its fluidity and is fixedly secured on the belt, so that no jutting out of the cake beyond both side edges of the belt takes place in the next hydroextraction zone B. The substance then moves on into the hydroextraction zone B to increase its degree of hydroextraction and is dewatered between the sponge belt 1 and the water-impervious endless belt 2. Here the water-absorptive sponge belt 1 is contracted and gets rid of water contained therein as it is pressed between each pair of opposed rolls 3, 3', 4, 4'. . . 12,12', and upon passing each pair of said rolls, the sponge belt 1 is again expanded to absorb moisture in the cake. Through repetition of this contraction and expansion of the sponge belt by each pair of opposed rolls, the moisture in the cake is gradually reduced, and the hydroextracting operation is completed upon reaching the last pair of rolls in the hydroextraction zone B. The dewatered cakes K are all attached to the water-impervious belt 2 and move into the strip-off zone C where they are stripped off by the scraper knife 15.

During this operation, the filtrate is received in the filtrate collecting trough 20 and discharged out of the system. The sponge belt 1 exiting from the strip-off zone C is washed with water spray from the shower 16, then passed between a pair of dewatering rolls 17 and 18 to remove water in the sponge to turn the latter into a dry state, and then transferred again to the concentration zone A.

Figure 4:
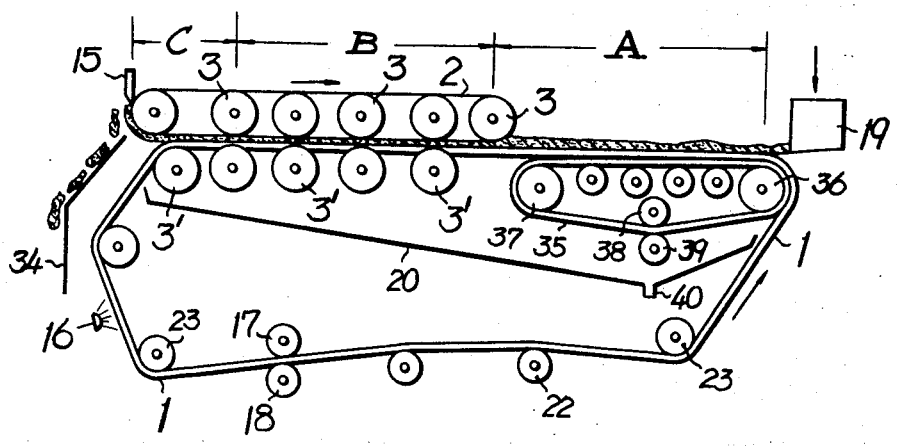
FIG. 4 is a side view of still another embodiment of the present invention.

In the embodiment of FIGS. 3 and 4, an endless water-absorptive sponge belt 1 is arranged movably while being supported by groups of supporting rolls and has formed on its upper traveling surface a concentration zone A, a hydroextraction B and a scraping zone C, and spanning the hydroextraction zone B there is provided an endless water-impervious belt 2 in opposition to the upper surface of the water-absorptive sponge belt 1 such that the former can move in the same direction as the latter. On both sides of the opposed length of said both belts are provided a suitable number of opposed rolling rolls 3, 3' . . . , and a cake scraper knife 15 is provided at the terminal end of the scrape-off zone C of the water-impervious belt 2, with a cake discharge chute 34 being provided thereunder. In the hydroextraction zone B, there is also provided a similar endless water-absorptive belt 35 in close attachment with the underside of the water-absorptive sponge belt 1. Said belt 35 is arranged movably by means of supporting rolls 36, 37 and is dehydrated during its travel by means of dehydrating rolls 38, 39. If desired, the water-absorptive belt 35 may be provided in the concentration zone A in close contact with the underside of the belt 1 as shown in FIG. 3, or may be provided spanning both concentration zone A and hydroextraction zone B. Also, the traveling directions or traveling velocities of the water-impervious belt 2 and the water-absorptive sponge belt 35 may be so adjusted as to differ from each other so as to better the hydroextracting efficiency. Further, the rolls for the water-absorptive sponge may be incorporated in the supporting rolls.

Also, in the figures, reference number 16 denotes a shower for washing the water-absorptive sponge belt 1, 17 and 18 a pair of dewatering rolls for the belt 1, 19 a sludge feeding box provided at an end of the concentration zone A of the sponge belt 1, 20 a filtrate collecting trough, 23 track or guide rolls, and 40 a discharge pipe.

In operation a sludgy substance to be hydroextracted is supplied from the feeding box 19 onto the water-absorptive sponge belt 1 so that said substance is laid thereon with substantially uniform thickness. While traveling through the concentration zone A, liquid in the sludge is sucked up by capillary action of the sponge, and then the sludge moves into the next hydroextraction zone B where it is hydroextracted between the sponge belt 1 and the water-impervious belt 2. Hydroextraction of the sludge is effected through repetition of compression and expansion of the water-absorptive sponge belt 1 upon passing each pair of opposed rolls 3, 3', . . . The falling liquid is collected in the filtrate collecting trough 20 and discharged through the discharge pipe 40. A part of the liquid squeezed out in this manner is absorbed in the water-absorptive sponge belt 35 which is closely attached to the underside of the belt 1 and travels while being incessantly dewatered by the dewatering rolls 38, 29, 39, to prevent return of the liquid into the cake and juttingout or overflow of the sludge out of the width of the belt. In case the traveling water-absorptive sponge belt 35 is provided in close attachment with the underside of the water-absorptive sponge belt 1 in the concentration zone A, the water-absorbing effect of the belt 1 in the concentration zone A will be further promoted to increase the hydroextraction capacity and hydroextracting velocity of the apparatus. The cake thus dehydrated in the hydroextraction zone B stays attached to the water-impervious endless belt 2 until it reaches the end of the scraping-off zone C where it is taken from said belt by the scraper knife 15 and discharged into the chute 34. In the meantime, the water-absorptive belt 1, separating from the scraping-off zone C is subjected to washing by the shower 16, then passed between the dewatering rolls 17 and 18 to squeeze out water contained therein, and returned back to the concentration zone A.

Figure 5:
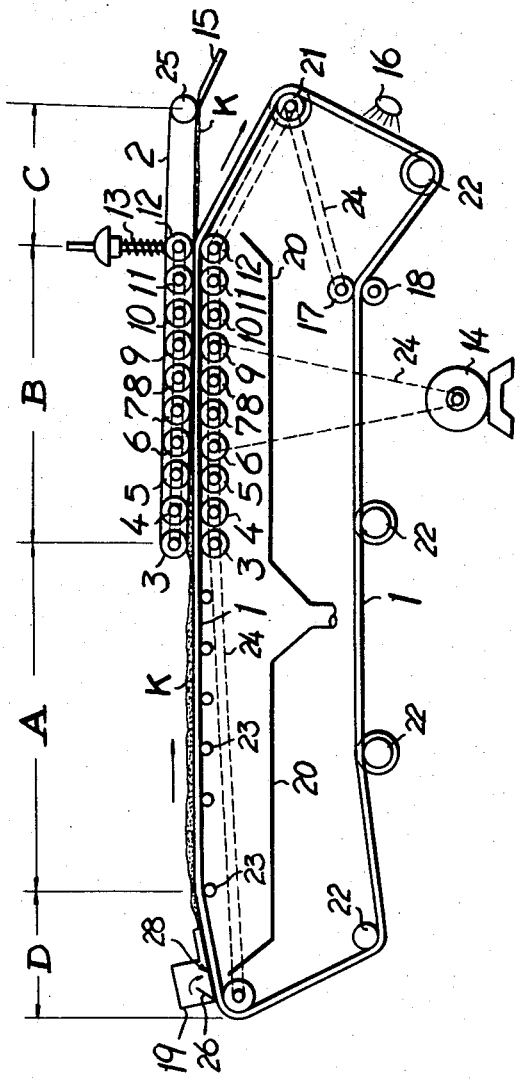
FIG. 5 is a side view of yet another embodiment provided with a feeding mechanism.
Figure 6:
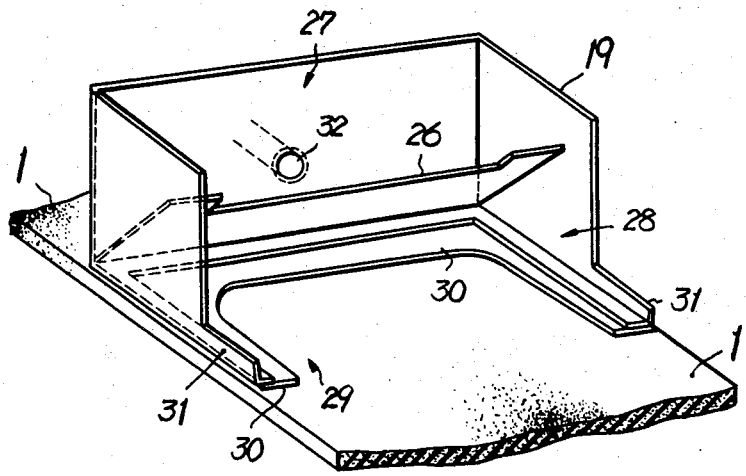
FIG. 6 is a perspective view of the feeding mechanism in the embodiment of FIG. 5.
Figure 7:
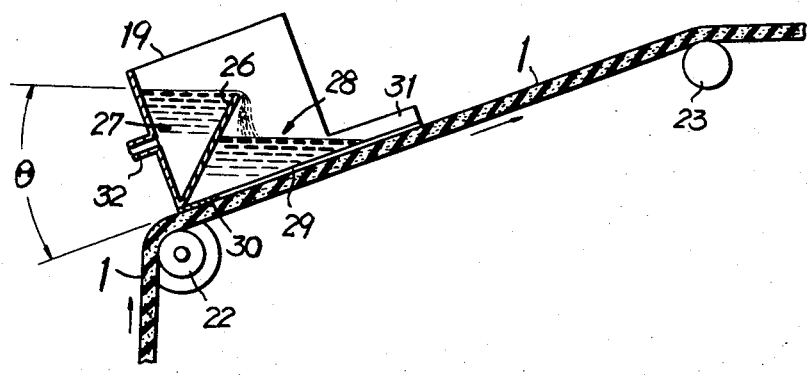
FIG. 7 is a sectional side view thereof illustrating a condition in operation.

In the embodiment of FIGS. 5-7, the water-absorptive sponge belt 1 arranged movably in an endless manner by the supporting rolls has formed on its upper traveling surface a sludge feed zone D, a concentration zone A, a hydroextraction zone B and a scraping-off zone C in that order in the traveling direction. It is to be noted that the sludge feed zone D is so arranged that it can assume a desired angle $\Theta$ with respect to the horizontal plane of the water-absorptive belt 1, and a sludge feeding box 19 is provided adjacent to or in contact with the upper surface of the said slant water-absorptive belt 1. It will also be seen that a slant overflow weir 26 is provided in said feeding box 19 to divide the interior thereof into two V-shaped sludge reservoirs 27, 28. The bottom of the sludge reservoir 28 is opened out as at 29 so that the belt 1 will serve as the practical bottom for said reservoir 28 in operation. Surrounding said opening 29 is provided a flexible seal member 30 adapted for prevention of sludge leakage. This seal member 30 may be made of synthetic resin, cloth or other similar material such as soft rubber or plastics. It is convenient to configure said member such that it is closely attached to the belt 1, with a portion being cut out to form an opening, so as to offer perfect protection against sludge leakage either lateral or backward of the belt. In the hydroextraction zone B there is provided a water-impervious endless belt 2 in opposition to the water-absorptive sponge belt 1 in such a manner as to effect removal of water contained in said belt 1. On both sides of the opposed length of said both belts are provided a plurality of paired rolls 3, 4, 5, 6, 7, 8, 9, 10, 11, 12 which are all coated with an elastic material having suitable hardness and which are so arranged relative to each other that the distance between said both belts is gradually narrowed down toward the outlet of the hydroextraction zone B. On the tension roll 12 at the terminal end of the zone B is provided a press spring 13 adapted to allow free vertical movement of the roll when a hard extraneous substance was pinned thereunder, thereby to prevent damage to the belts in such event.

Also in the figures, reference number 14 designates a prime mover for rotating the supporting rolls and the opposed rolls through known means such as chains and sprockets, 15 a cake scraper knife provided near the end of the water-impervious endless belt 2 in the scraping-off zone C, 16 a shower for washing the water-absorptive sponge belt 1, 17 and 18 a pair of dewatering rolls for the sponge belt 1, 20 a filtrate collecting trough provided under the combined length of zone A and zone B of the sponge belt 1, 21 a belt driving wheel, 22 track rolls, 23 guide rolls, 24 a driving belt, 25 a track roll for the water-impervious belt, which may be a driving wheel interlocked with the water-absorptive belt 1 or may be an independent driving wheel, 31 an extended frame, and 32 a feeding port. Letter K represents the cake formed.

The water-absorptive belt 1 is here exemplified as having been made of a water-absorptive sponge belt, but it is possible to use a water-absorptive cloth or other material which can produce the same effect. Also, in the shown embodiment, an assembly of opposed rolls is employed for supporting the water-impervious belt, but such roll assembly may be substituted by a flat, corrugate, curved or otherwise suitably shaped plate assembly or by a combination of rolls and plates. It is also possible to provide means for moving these supporting structures so as to press the belt downwardly or upwardly, or to make arrangement such that the distance between the opposed supporting structures is gradually narrowed down, thereby to promote removal of water contained in the water-absorptive belt. 1. In the case of the former, when the supporting structure on the impervious belt side is made movable, it is preferable for better dewatering effect to form the impervious belt by using a belt having suitable elasticity.

The sludge to be hydroextracted is first fed into the sludge reservoir 29 of the feeding box 19 and then overflown over the weir 26 into the sludge reservoir 28 whence the sludge is supplied onto the water-absorptive sponge belt 1 to form a sludge layer of substantially uniform thickness. It should be noted here that the filter medium 1, which has been dewatered by rolls to restore its water absorbability, plays a role of the moving bottom for the sludge reservoir 28, so that water absorption is effected by capillary action to the very limit of the capacity. The solids corresponding to the absorbed water are evenly deposited on the surface of the belt and ascend along the inclined surface with the water-absorptive belt to move into the concentration zone A, and while traveling through said zone A, the sludge is concentrated by capillary action of the sponge until it loses its fluidity and is fixedly secured on the belt, so that no jutting out of the cake beyond the width of the belt in the next hydroextraction zone B takes place. Then the sludge is further transferred to the hydroextraction zone B and is hydroextracted in this zone while traveling between the sponge belt 1 and the water-impervious belt 2. The water-absorptive sponge belt 1 is contracted upon entering between each pair of opposed rolls 3 – 12 to get rid of water in the sponge and is again expanded upon passing each said pair of rolls to suck in the water present in the cake. Water content in the cake is gradually reduced through repetition of this contraction and expansion of the sponge belt. The hydroextracting operation is completed upon reaching the final pair of rolls of the hydroextraction zone B, and the hydroextracted cake K stays attached to the endless water-impervious belt 2 until it reaches the scraping-off zone C where it is scraped off by the scraper knife 5.

The filtrate, on the other hand, is collected in the filtrate collecting trough 20 and discharged out of the system. The sponge belt 1, which moves away from the scraping-off zone C, is washed by water spray from the shower 16, then passed between the dewatering rolls 17, 18 to remove water in the sponge, and returned back to the concentration zone.

In still another embodiment of FIG. 8, the water-absorptive endless belt 1 is made of foam rubber, felt or other sponge-like or porous elastic filter cloth and travelably supported by a plurality of supporting rolls 23,..., and 23',... Said belt is also so arranged that it is reversed many times in its course of travel to form multiple hydroextraction stages (two stages E, F in the shown embodiment), each of which includes a concentration zone A, a hydroextraction zone B and a scraping zone C. Near the belt lead-in section at an end on the traveling surface of each of the said stages E, F is provided a sludge feeding means 19, 19', and near the other end of each of the said stages are provided a compression roll 41, 41' provided with a cake scraper knife 15, 15', and a tension roll 12, 12' having a pressure control means 13, 13' for adjusting pressing force between the roll 41, 41' and the belt 1. It will also be seen that just in front of the sludge feeding means 19, 19' on each stage of the belt 1, there are provided a washing shower 16, 16' and a pair of dewatering rolls 17, 17' and 18, 18'.

Also in the figure, reference numbers 20, 20' denotes respectively a filtrate and belt-washed waste water collecting trough provided beneath each stage, and 42, 42' respectively a conveyor for carrying away the cakes scraped off by the cake scraper 15, 15' in each stage. The rolls may be arranged such that they may roll either independently or in interlocked relation to each other, and if need be, another traveling belt may be provided in opposition to the surface of the traveling belt 1.

The water-absorptive belt 1, which is driven to travel in the direction of arrows by a separately provided driving means (not shown), is reversed upon passing the hydroextraction section E of the upper stage, so that the surface of the traveling belt is turned upside down in the hydroextraction section F of the lower stage. The sludge to be dehydrated is fed evenly by the sludge feeding means 19, 19' onto the up-faced surface of the traveling belt 1 in each stage E, F, and in the course of the travel of the belt 1, liquid in the sludge is gradually absorbed by the water-absorptive belt 1, while the over-saturated portion of the liquid in the belt is dropped into the respective troughs 20, 20'.

Upon reaching the compression rolls 41, 41', the sludge, which has already been considerably hydroextracted in the course of travel of the belt 1, is further subjected to compressive hydroextraction by the pressing force given between the belt 1 and the respective compression rolls 41, 41' by the tension rolls 12, 12', and the thereby squeezed out liquid is dropped into the respective troughs 20, 20'. The cakes on the belt are deposited on the respective compression rolls 41, 41', then stripped off by the cake scraper knives 15, 15' and carried away on the respective conveyors 42, 42'. Having been cleared of the cakes, the belt 1 is then washed by means of washing showers 16, 16', then passed between the dewatering rolls 17, 18, 17' 18' to squeeze out water contained therein, and then further advanced into a hydroextraction stage to repeat the above hydroextracting process, thus allowing continuous hydroextracting operation at high efficiency.

We claim:

1. A sludge-hydroextractor device for removal of water from sludge and forming a sludge cake, comprising a support frame, an endless, water-absorptive readily-compressible belt mounted within said support frame, a plurality of rollers rotatably mounted on said frame transversely to and in contact with said belt and supporting said belt in said frame, driving means connected to said rollers for rotating same in a single sense and thereby causing said endless belt to travel in a single sense, sludge-feeding means for spreading sludge on the upper surface of said belt, means defining a concentration zone including said feeding means and a first region immediately downstream from said feeding means wherein said belt rests on rollers while traversing same without application of pressure from above, water being absorbed from said sludge by said belt through capillarity, a hydroextraction zone immediately downstream from said concentration zone, said hydroextraction zone including spaced-apart second rollers beneath said belt and water-impervious compression means above said belt, the clearance between said compression means and said second rollers decreasing in the forward direction of travel of said belt whereby said belt holding sludge, as said belt traverses said second rollers, is alternately compressed by said rollers against said compression means for dewatering said belt and allowed to expand between successive second rollers for absorption of additional water from said sludge, said decrease in clearance between said second rollers and said compression means resulting in dewatering of said belt to successively greater degrees as said belt traverses said hydroextraction zone thereby forming a sludge-cake, a cake-removal zone immediately downstream from said hydroextraction zone including cake removal means for removing dewatered sludge from said device, and a trough beneath said concentration and hydroextraction zones for receiving water expelled from said water-absorptive belt and conducting said water away from said device without making further contact with any portion of said belt, said belt traversing said concentration, hydroextraction and cake-removal zones in that order.

2. A filtration-hydroextractor according to claim 1, in which said sludge feeding means is a box, including an overflow weir dividing the interior of said box into two contiguous sludge reservoirs, one of said sludge reservoirs being opened at its bottom to the water-absorptive belt so as to constitute, in practice, a sludge reservoir bottomed by said water-absorptive belt, and a flexible seal member being provided to close the space between the bottom of said one of said sludge reservoirs and said water-absorptive belt.

3. A device as defined in claim 1, further comprising a second water-absorptive belt positioned beneath and contiguous with at least a portion of that portion of said water-absorptive belt within said hydroextraction zone, said second water-absorptive belt in combination with said water-absorptive belt being subject to alternate compression and release by said plurality of rollers.

4. A device as defined in claim 1, wherein an additional water-absorptive belt is positioned beneath and contiguous with at least a portion of that portion of said water-absorptive belt within said concentration zone.

5. A device as defined in claim 1, wherein said water-impervious compression means is a water-impervious belt.

6. A sludge-hydroextractor device as defined in claim 1, wherein said water-absorptive belt travels through a plurality of sets of zones, each comprising a concentration zone, a hydroextraction zone, and a cake removal zone.

7. A device as defined in claim 5, wherein said cake adheres to said water-impervious belt and is removed therefrom by cake-removal means.

8. A device as defined in claim 7, wherein said cake-removal means is a scraper.

9. A sludge-hydroextractor device as defined in claim 1, wherein said water-impervious compression means comprises a water-impervious, endless belt, means for moving said water-impervious belt in the same direction and at the same speed as said water-absorptive belt and a plurality of rollers each positioned opposite one of said rollers in said hydroextraction zone and urging said water-impervious belt against said water-absorptive belt.

* * * * *